(12) United States Patent
Wu (10) Patent No.: US 11,583,369 B2
(45) Date of Patent: Feb. 21, 2023

(54) IMPLANT AND ABUTMENT TOOTH ASSEMBLY

(71) Applicant: Kuan-Lin Wu, Taibao (TW)

(72) Inventor: Kuan-Lin Wu, Taibao (TW)

( * ) Notice: Subject to any disclaimer, the term of this patent is extended or adjusted under 35 U.S.C. 154(b) by 346 days.

(21) Appl. No.: 16/882,840

(22) Filed: May 26, 2020

(65) Prior Publication Data

US 2021/0369419 A1  Dec. 2, 2021

(51) Int. Cl.
*A61C 8/00* (2006.01)
*A61C 13/15* (2006.01)

(52) U.S. Cl.
CPC .......... *A61C 8/0053* (2013.01); *A61C 8/0022* (2013.01); *A61C 8/0068* (2013.01); *A61C 19/003* (2013.01)

(58) Field of Classification Search
CPC ... A61C 8/0053; A61C 8/0022; A61C 8/0068; A61C 8/003; A61C 8/005; A61C 8/0048; A61C 8/00; A61C 8/0015; A61C 19/00
USPC ....................................... 433/172–176, 201.1
See application file for complete search history.

(56) References Cited

U.S. PATENT DOCUMENTS 5,302,125 A * 4/1994 Kownacki ............ A61C 8/0053
                                                                433/172
5,516,288 A * 5/1996 Sichler ................. A61C 8/0001
                                                                433/173

FOREIGN PATENT DOCUMENTS

WO    WO-2017042154 A1 *  3/2017

* cited by examiner

*Primary Examiner* — Ralph A Lewis
*Assistant Examiner* — Mirayda A Aponte
(74) *Attorney, Agent, or Firm* — Alan D. Kamrath; Karin L. Williams; Mayer & Williams PC (57) ABSTRACT

An implant and abutment tooth assembly includes an implant, a rotatable connector, a screw bolt, and a photo-curable resin capsule. The implant includes a threaded section and a rotatable adjustment seat, wherein the rotatable adjustment seat has an upper connection portion. The upper connection portion has a groove, two spherical portions, and a receiving trench. The rotatable connector includes a spherical rotation face, two end faces, an abutment, an internal screwing section, and a stepped notch. The screw bolt includes an external screwing section, a rotary head, and a force segment. The external screwing section is screwed with the internal screwing section of the rotatable connector, and the rotary head is movably received in the stepped notch of the rotatable connector. The photocurable resin capsule includes 0.1 g to 0.8 g of light-cured resin and is accommodated in the receiving trench of the implant.

3 Claims, 11 Drawing Sheets

IMPLANT AND ABUTMENT TOOTH ASSEMBLY

BACKGROUND OF THE INVENTION

Field of the Invention

The present invention relates to an implant and abutment tooth assembly which is configured to be implanted into inclined front gums to fix a crown.

Description of the Prior Art

In a conventional dental implant surgery, an implant is embedded into gums, and an abutment is removably mounted on the implant and extends out of the gums so that a crown is fixed on the abutment.

To enhance success probability of the dental implant surgery, the abutment is formed with the implant so as to form a single device. However, the abutment is not perpendicularly implanted into the gums, thus causing failed dental implant surgery.

The present invention has arisen to mitigate and/or obviate the afore-described disadvantages.

SUMMARY OF THE INVENTION

The primary object of the present invention is to provide an implant and abutment tooth assembly which allows an angle between the implant and abutment to be adjusted thereby overcoming shortcomings of a conventional abutment tooth.

Another objective of the present invention is to provide an implant and abutment tooth assembly which is implanted into inclined front gums of the bone ridge to enhance the probability of success and the quality of dental implant surgery greatly.

To achieve above-mentioned objectives, an implant and abutment tooth assembly provided by the present invention contains: an implant, a rotatable connector, a screw bolt, and a photocurable resin capsule.

The implant includes a threaded section, and the threaded section has a rotatable adjustment seat formed on a top thereof. The rotatable adjustment seat has an upper connection portion, the upper connection portion has a groove defined on a top thereof, two spherical portions rotatably connected beside the groove, and a receiving trench formed on a center of the groove.

The rotatable connector includes a spherical rotation face formed on the rotatable connector, and the rotatable connector includes two end faces formed beside the spherical rotation face. The spherical rotation face is rotatably accommodated in the groove of the implant, the two end faces contact with the two spherical portions respectively, the rotatable connector has an abutment extending from a side thereof along a central axis of the rotatable connector, an internal screwing section formed in a center of the abutment and passing to the rotatable connector, and a stepped notch formed on a top of the internal screwing section with respect to the abutment.

The screw bolt includes an external screwing section, a rotary head arranged on a top of the external screwing section, and a force segment formed on a bottom of the screw bolt. The external screwing section is screwed with the internal screwing section of the rotatable connector, and the rotary head is movably received in the stepped notch of the rotatable connector.

The photocurable resin capsule includes 0.1 g to 0.8 g of light-cured resin fixed in the photocurable resin capsule and is accommodated in the receiving trench of the implant.

Thereby, the implant and abutment tooth assembly is implanted into the inclined front gums of the bone ridge to enhance the probability of success and the quality of dental implant surgery greatly.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
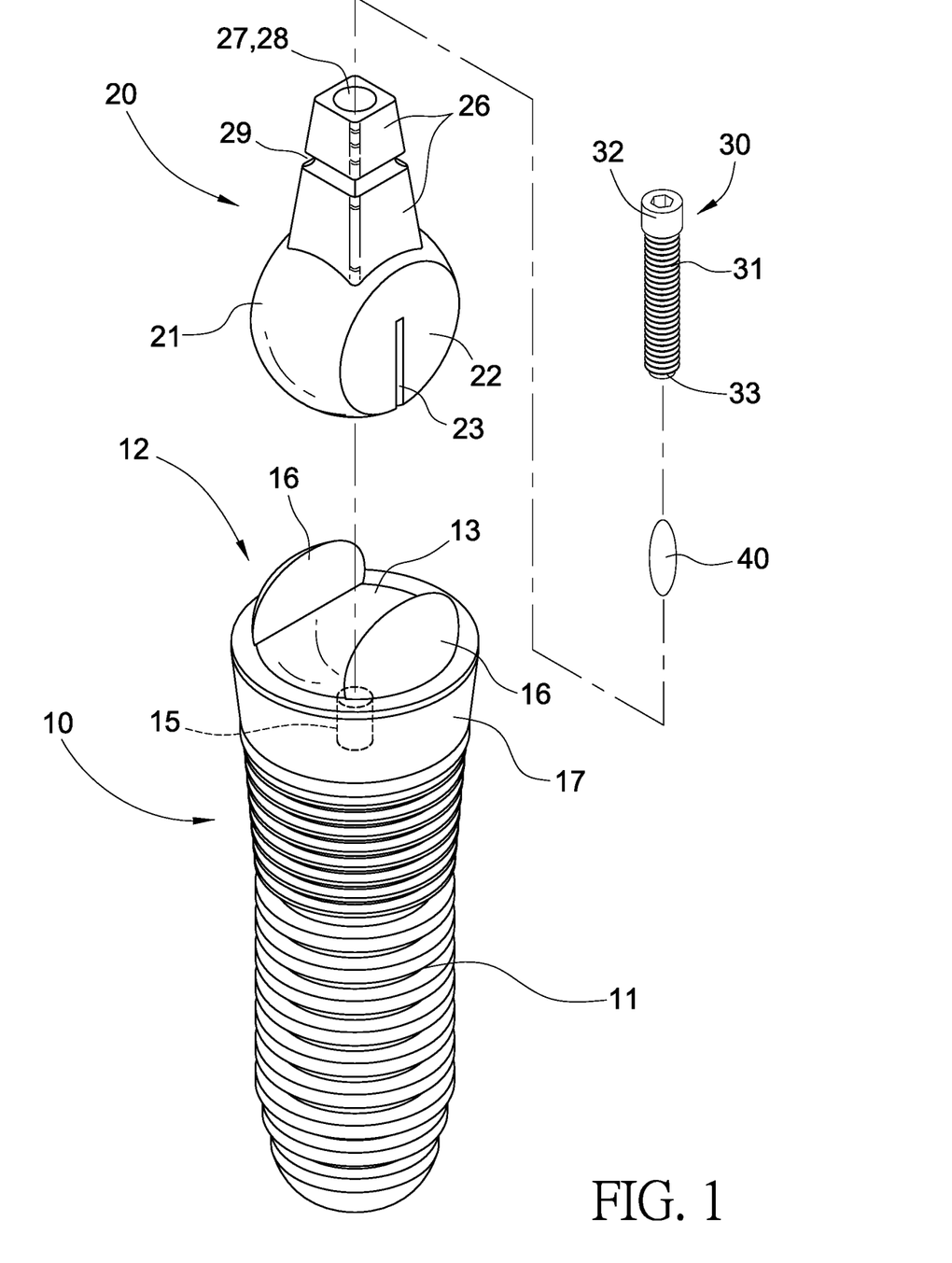
FIG. 1 is a perspective view showing the exploded components of an implant and abutment tooth assembly according to a preferred embodiment of the present invention.
Figure 2:
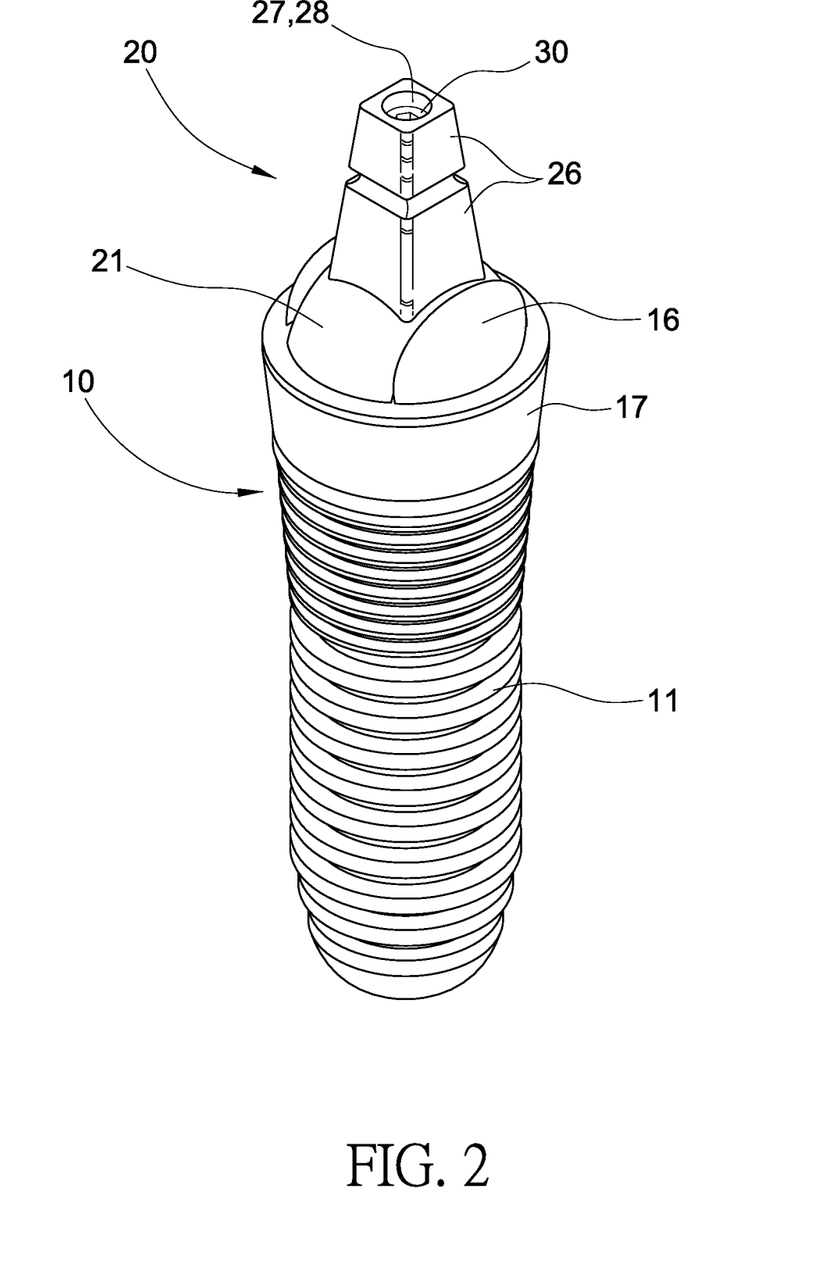
FIG. 2 is a perspective view showing the assembly of an implant and abutment tooth assembly according to the preferred embodiment of the present invention.
Figure 3:
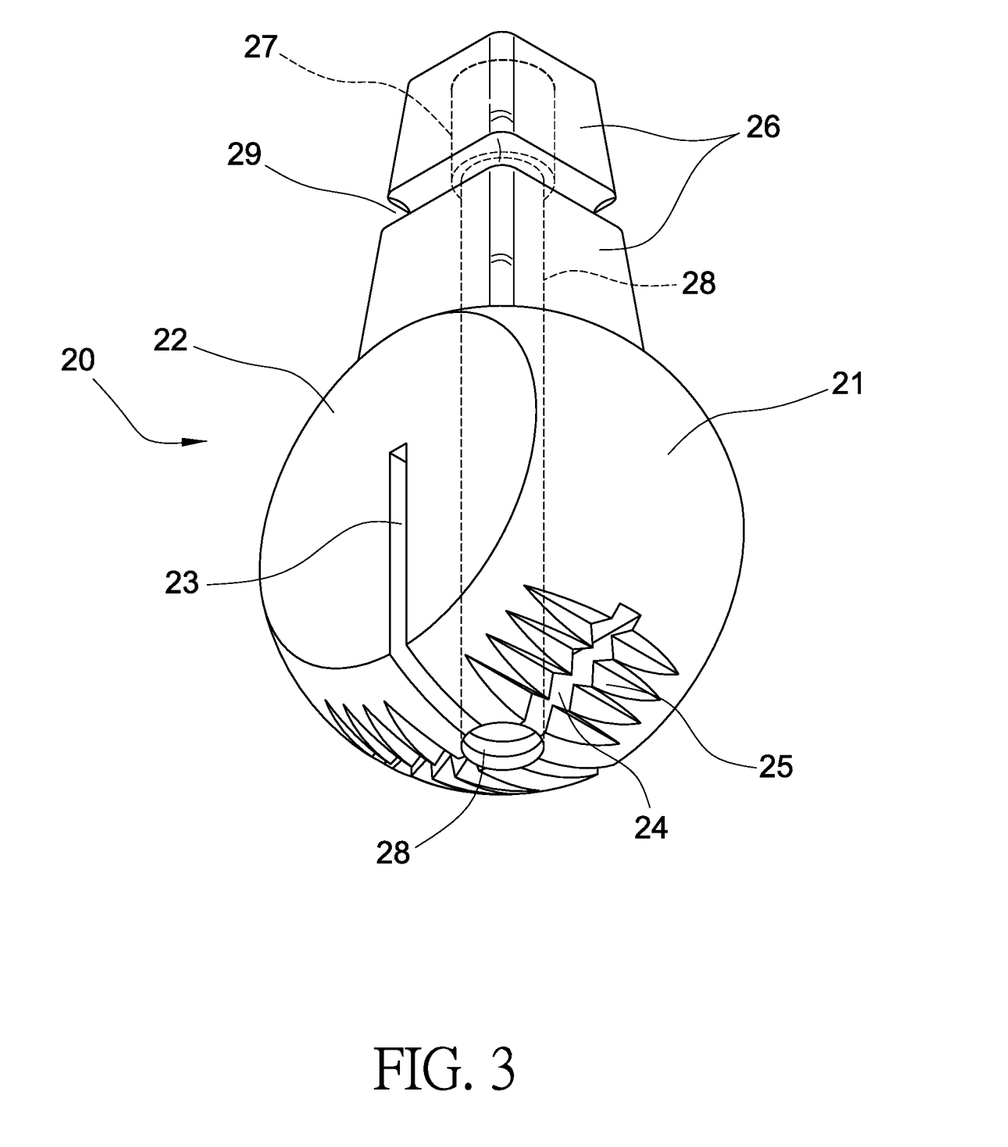
FIG. 3 is a perspective view showing the assembly of a rotatable connector of an implant and abutment tooth assembly according to the preferred embodiment of the present invention.
Figure 4:
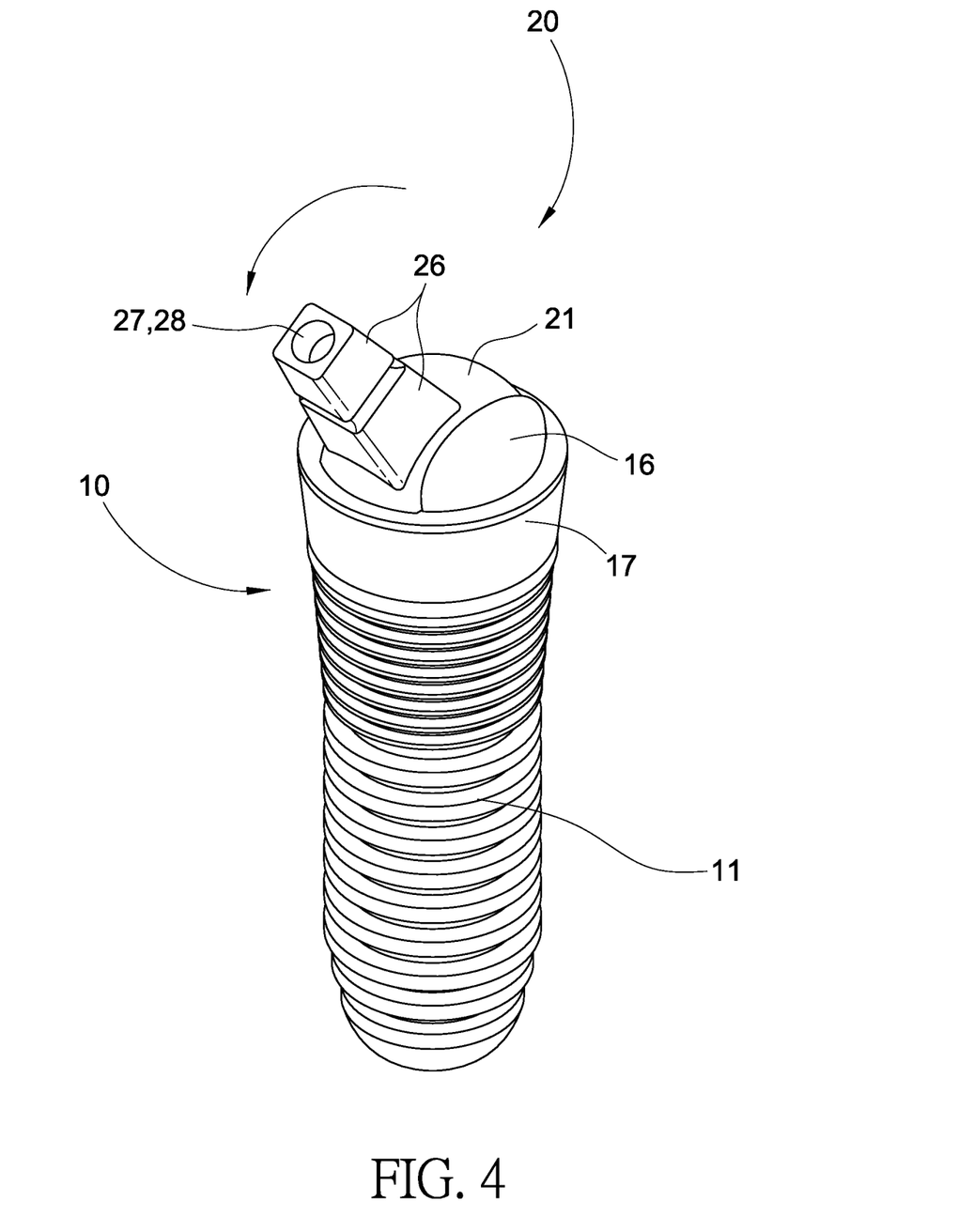
FIG. 4 is a perspective view showing the operation of an implant and abutment tooth assembly according to the preferred embodiment of the present invention.
Figure 5:
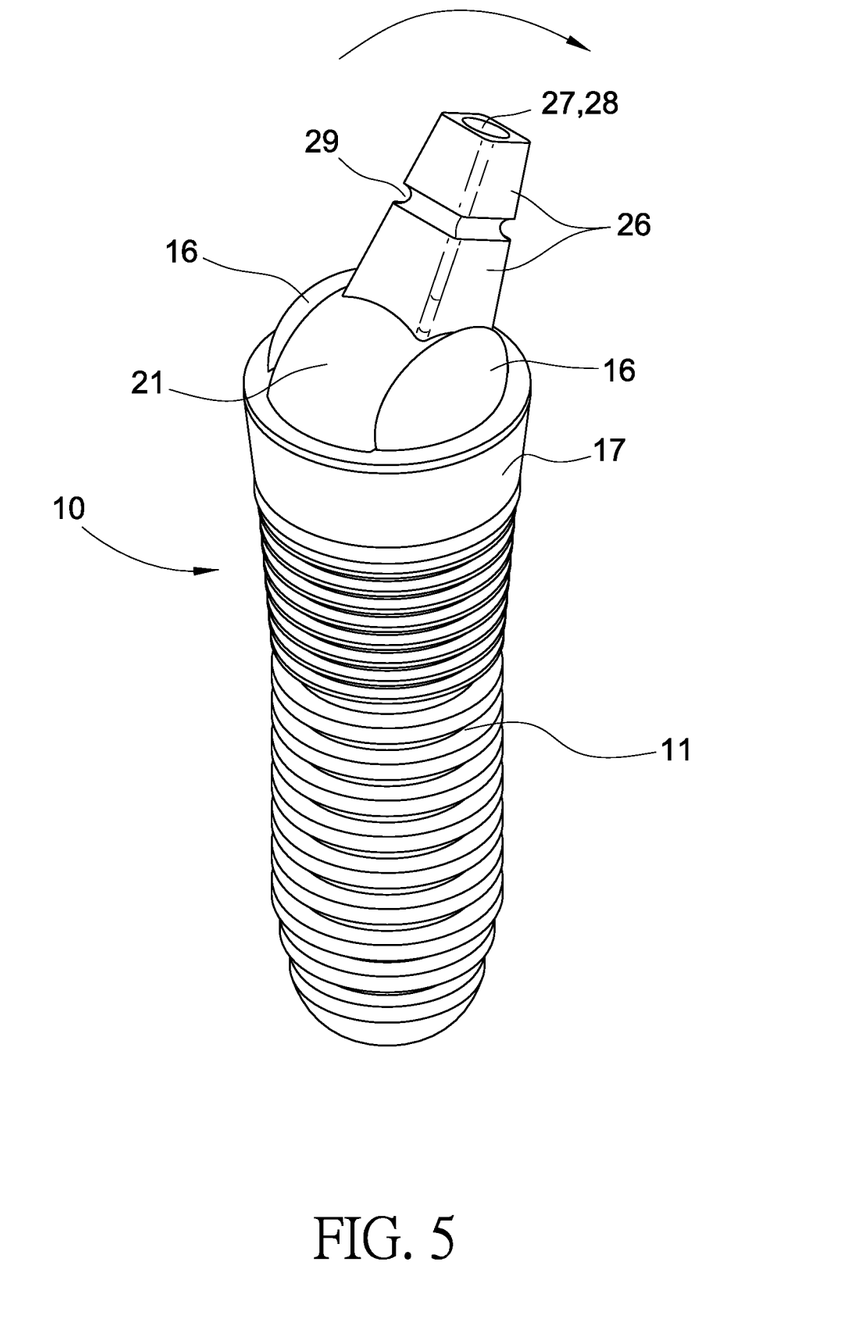
FIG. 5 is another perspective view showing the operation of an implant and abutment tooth assembly according to the preferred embodiment of the present invention.
Figure 6:
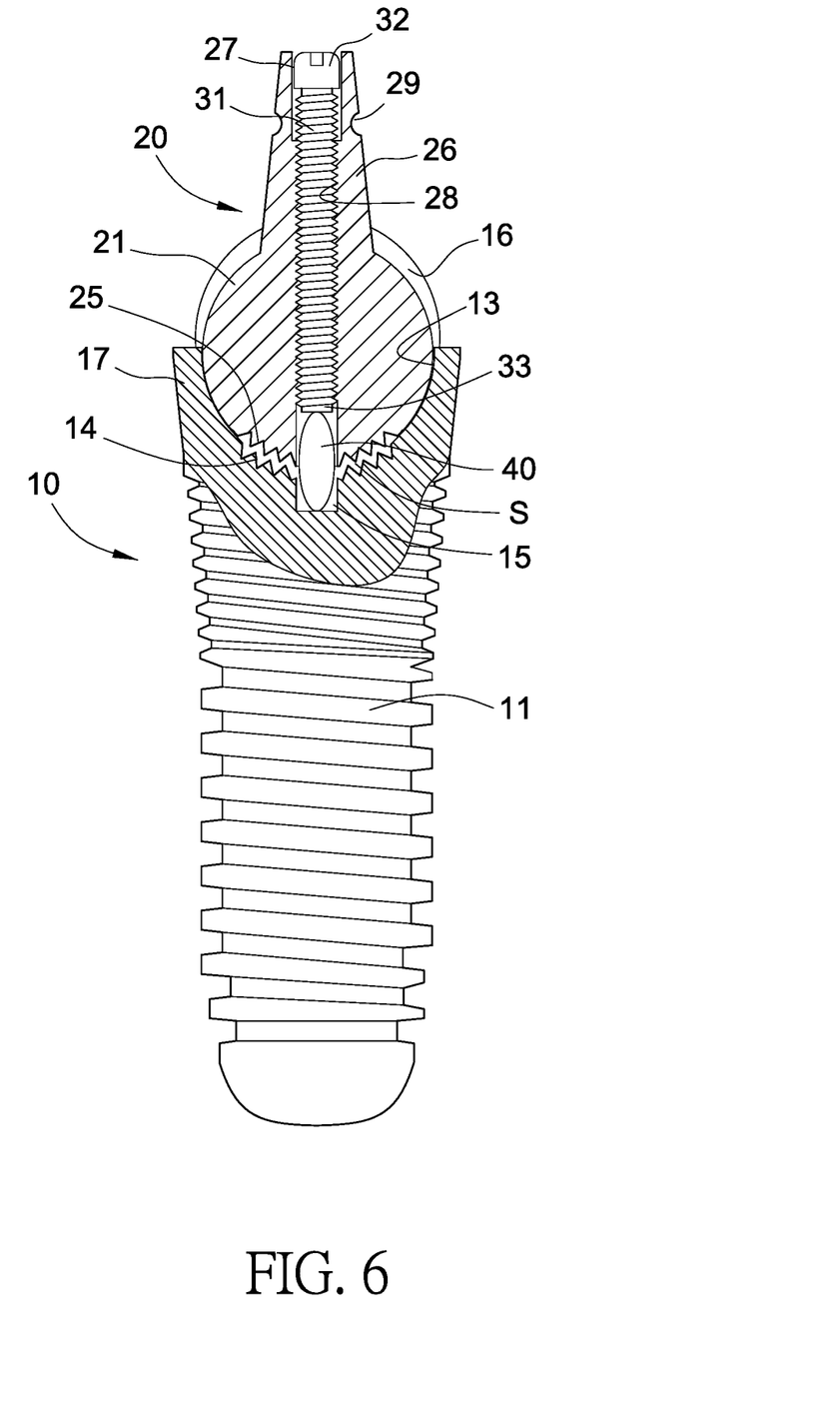
FIG. 6 is a cross sectional view showing the operation of an implant and abutment tooth assembly according to the preferred embodiment of the present invention.
Figure 7:
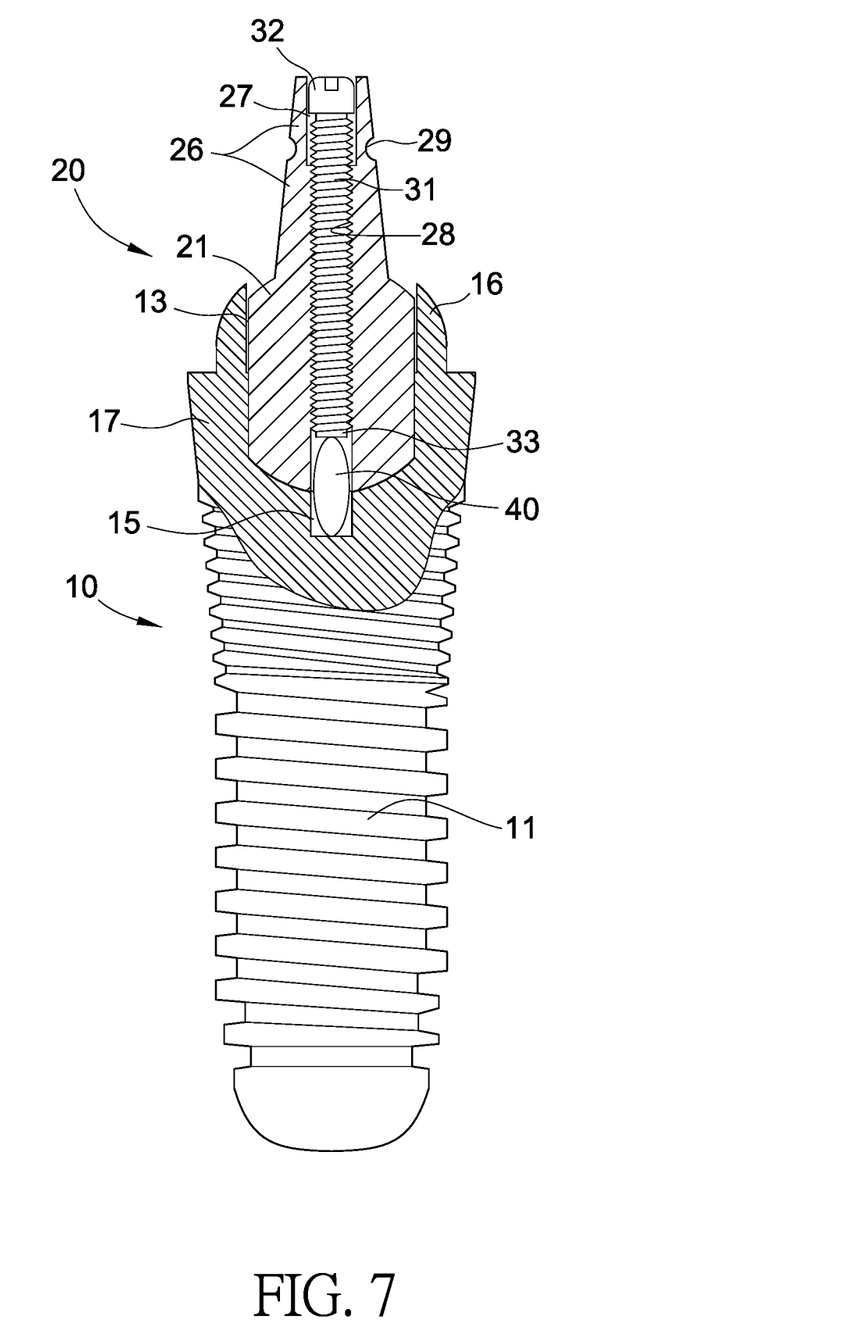
FIG. 7 is another cross sectional view showing the operation of an implant and abutment tooth assembly according to the preferred embodiment of the present invention.
Figure 8:
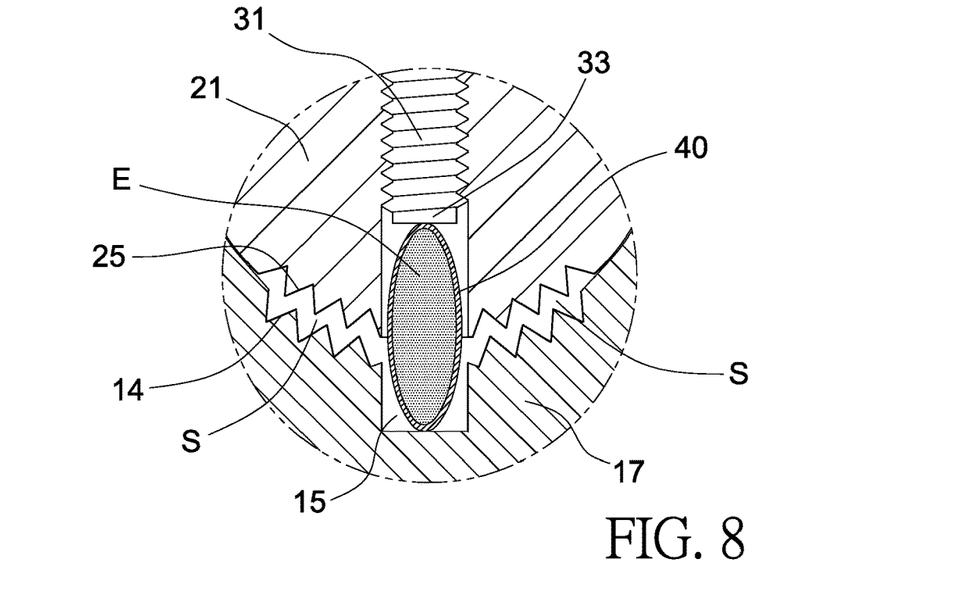
FIG. 8 is an amplified cross-sectional view showing the operation of a part of an implant and abutment tooth assembly according to the preferred embodiment of the present invention.
Figure 9:
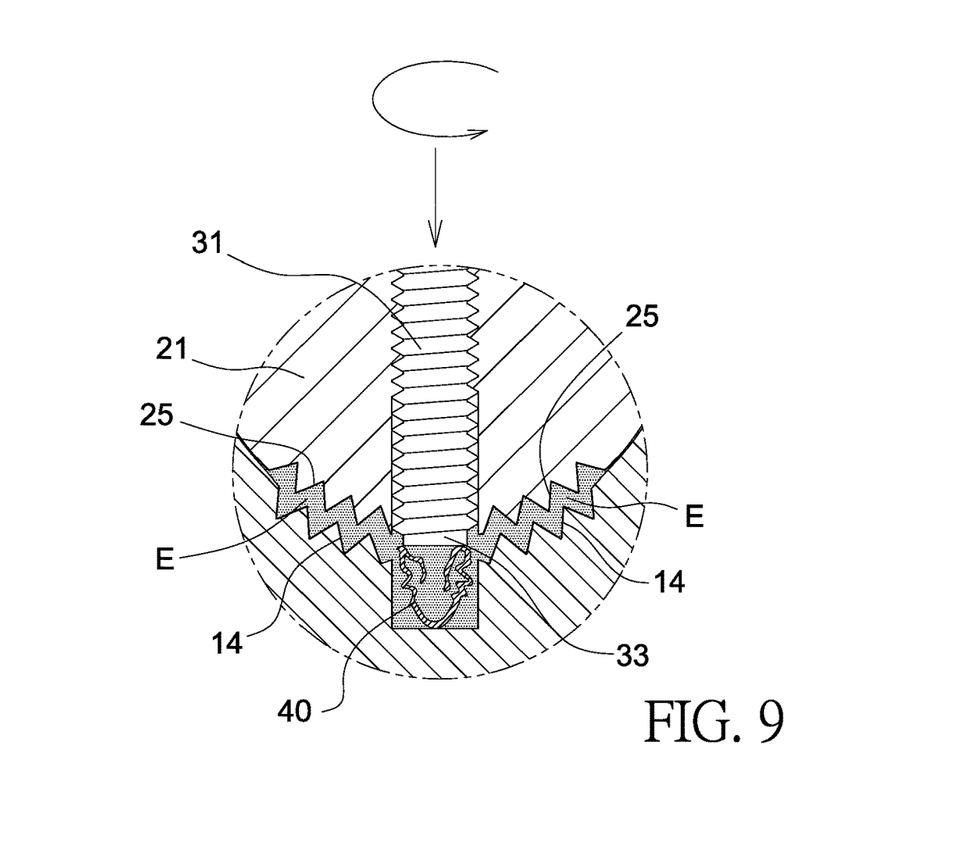
FIG. 9 is another amplified cross-sectional view showing the operation of a part of an implant and abutment tooth assembly according to the preferred embodiment of the present invention.
Figure 10:
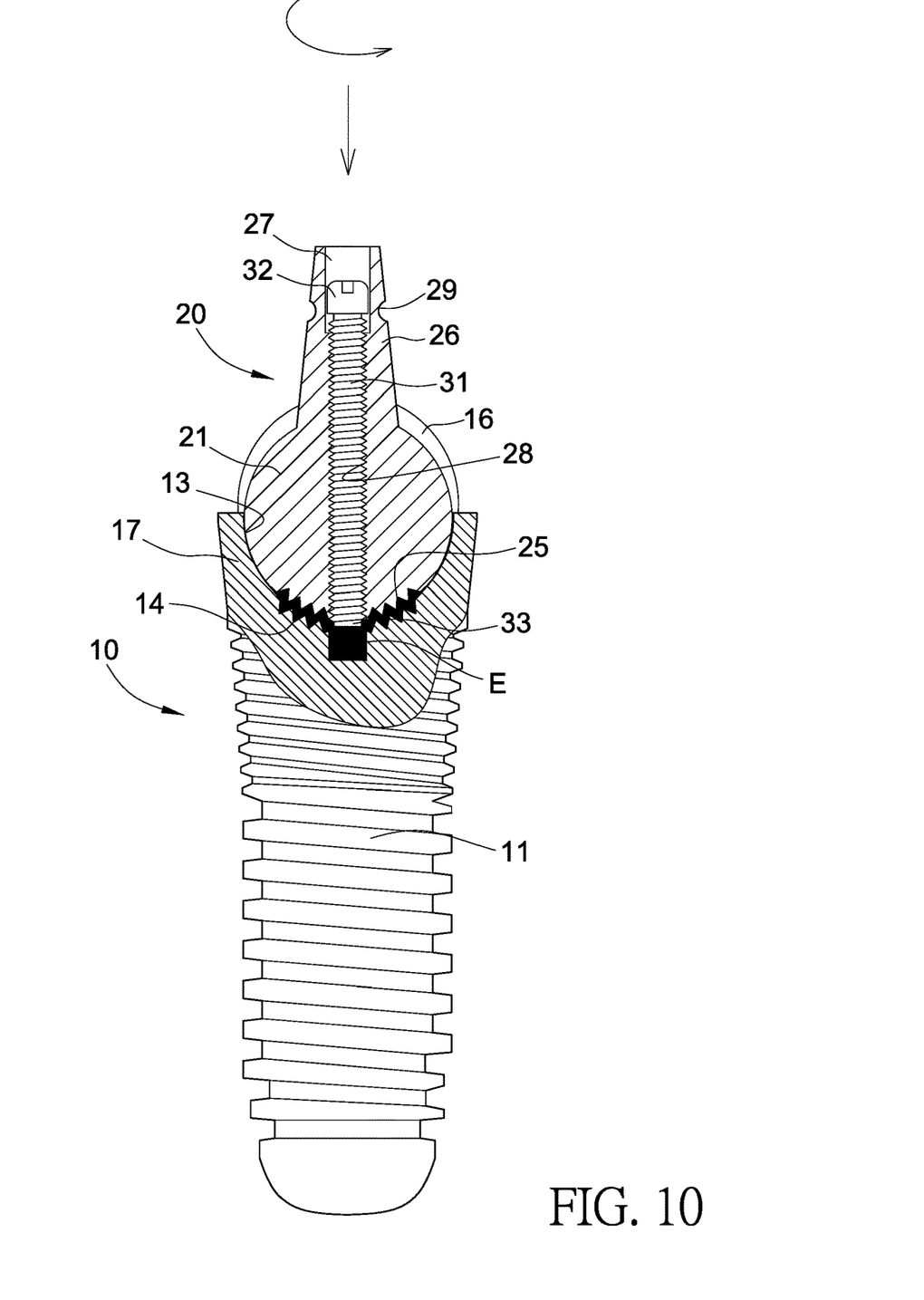
FIG. 10 is also another cross sectional view showing the operation of an implant and abutment tooth assembly according to the preferred embodiment of the present invention.
Figure 11:
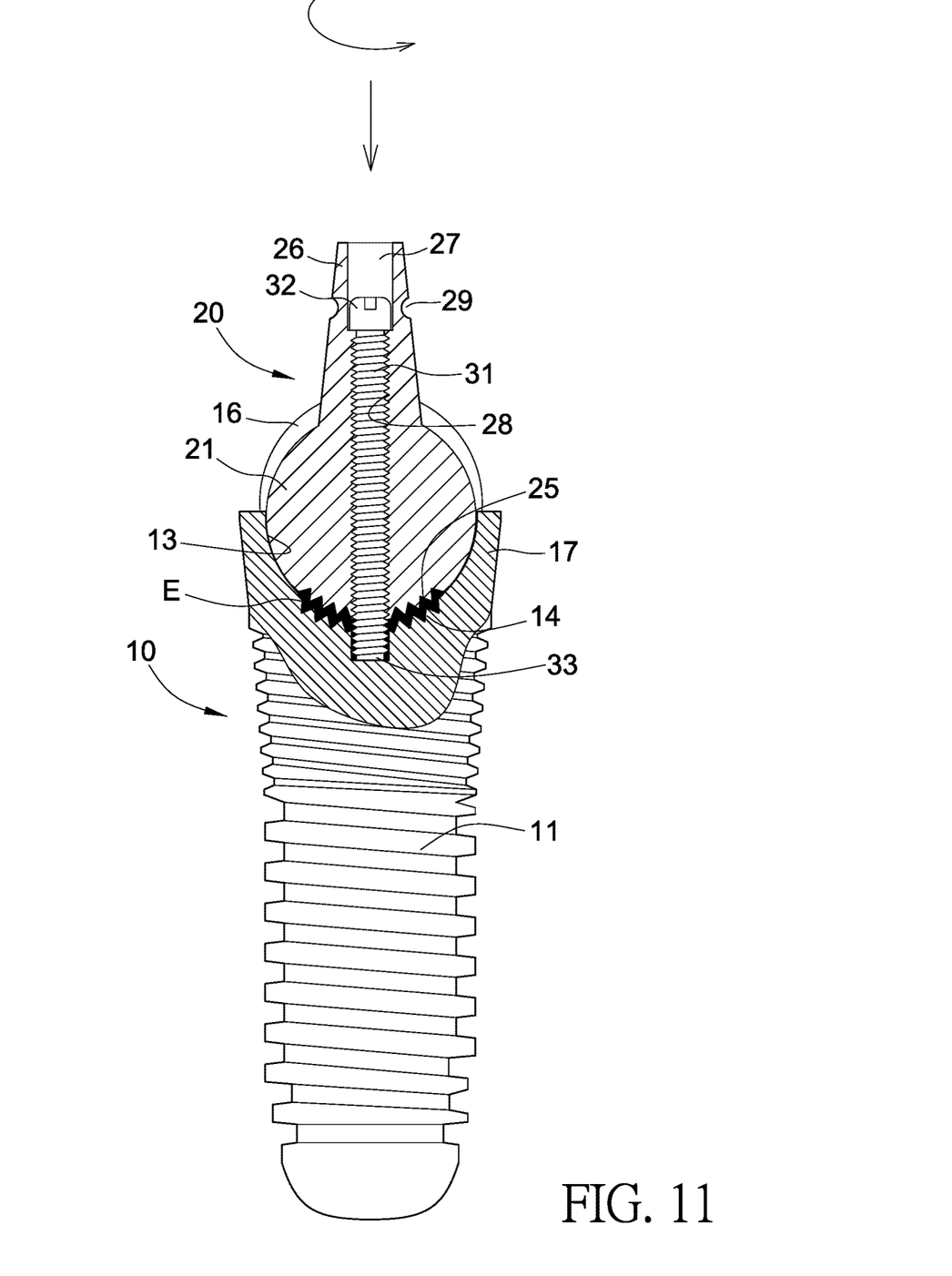
FIG. 11 is still another cross sectional view showing the operation of an implant and abutment tooth assembly according to the preferred embodiment of the present invention.
Figure 12:
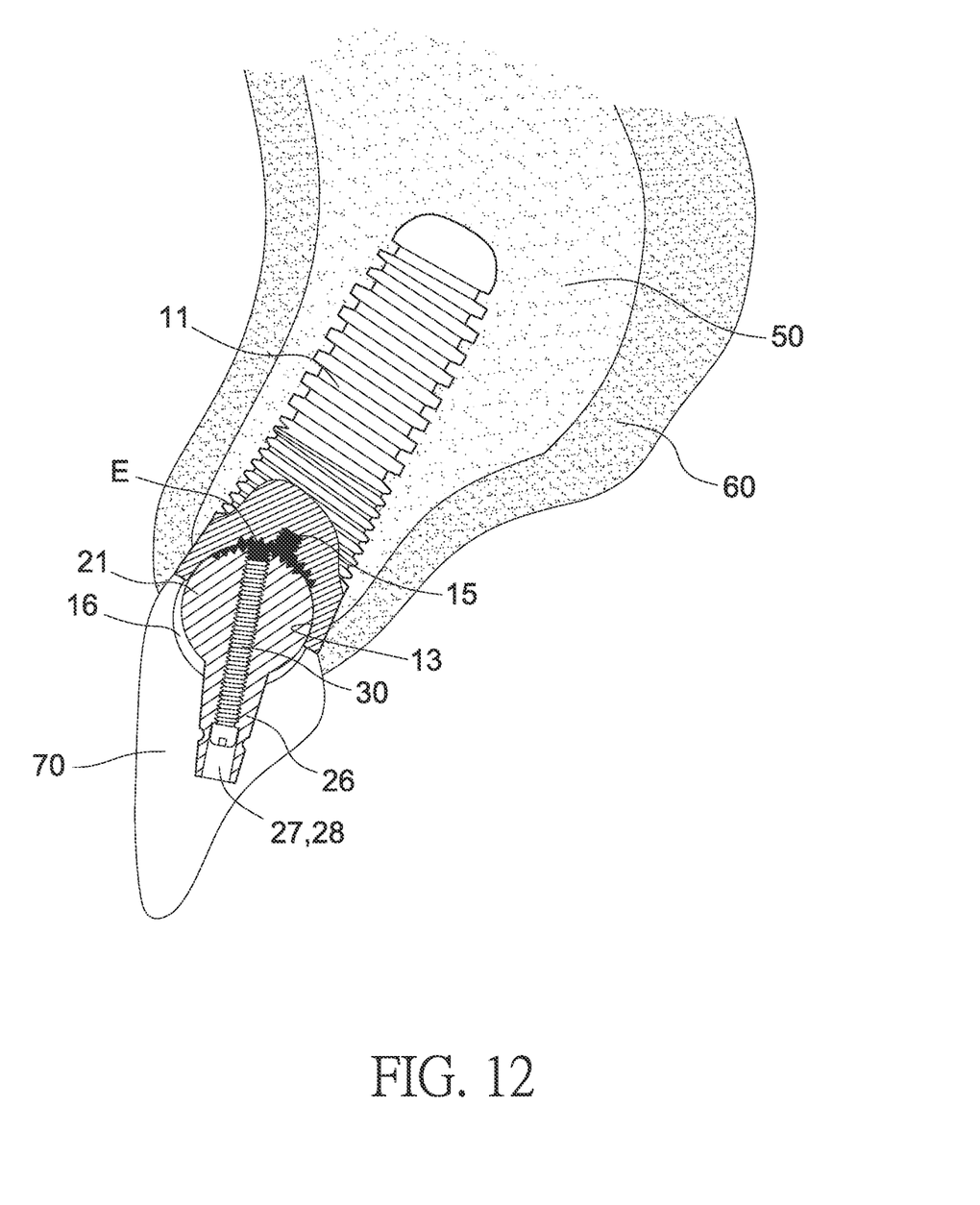
FIG. 12 is a cross sectional view showing the application of an implant and abutment tooth assembly according to the preferred embodiment of the present invention.

With reference to FIGS. 1-12, an implant and abutment tooth assembly having an angle thereof capable of being adjusted according to a preferred embodiment of the present invention comprises:

an implant 10 including a threaded section 11 configured to screw into a bone ridge 50 of gums 60, when the implant 10 is rotated, a conical threaded portion and a columnar threaded portion of the threaded section 11 to produce a cutting effect to implant the implant and abutment tooth assembly into inclined front gums, wherein the implant 10 has a rotatable adjustment seat 12 formed on a top thereof, and the rotatable adjustment seat 12 has an upper connection portion 17, wherein the upper connection portion 17 has a groove 13 defined on a top thereof, two spherical portions 16 rotatably connected beside the groove 13, and a receiving trench 15 formed on a center of the groove 13;

a rotatable connector 20 including a spherical rotation face 21 formed on the rotatable connector 20, two end faces 22 formed beside the spherical rotation face 21, wherein the spherical rotation face 21 is rotatably accommodated in the groove 13 of the implant 10, the two end faces 22 contact with the two spherical portions 16 respectively so that the spherical rotation face 21 is rotated to a desired angle relative to the groove 13, and the desired angle is within 0 degree to 35 degrees, wherein the rotatable connector 20 has an abutment 26 extending from a side thereof along a central axis of the rotatable connector 20, an internal screwing section 28 formed in a center of the abutment 26 and passing to the rotatable connector 20, a stepped notch 27 formed on a top of the internal screwing section 28 with respect to the abutment 26, wherein the abutment 26 is formed in a square pyramid shape and has a recess 29 formed around a predetermined area thereof; wherein the abutment 26 is connected with a crown 70 to define the implant and abutment tooth assembly tooth;

a screw bolt 30 including an external screwing section 31, a rotary head 32 arranged on a top of the external screwing section 31, and a force segment 33 formed on a bottom of the screw bolt 30, wherein the external screwing section 31 is screwed with the internal screwing section 28 of the rotatable connector 20, and the rotary head 32 is movably received in the stepped notch 27 of the rotatable connector 20;

a photocurable resin capsule 40 including 0.1 g to 0.8 g of the light-cured resin E fixed in the photocurable resin capsule 40 and being accommodated in the receiving trench 15 of the implant 10.

The groove 13 of the implant 10 includes multiple toothed faces 14 formed on a center thereof, and the spherical rotation face 21 of the rotatable connector 20 has multiple toothed projections 25 arranged on a bottom thereof to correspond to the multiple toothed faces 14, wherein a connecting chamber S is defined among the multiple toothed projections 25 and the multiple toothed faces 14, a slit 24 is defined among the multiple toothed projections 25, and a respective end face 22 of the rotatable connector 20 has a cutout 23 defined on a center thereof to correspond to the slit 24.

When the implant 10 is fixed into the bone ridge 50, the force segment 33 of the screw bolt 30 forces the photocurable resin capsule 40, such that the photocurable resin capsule 40 is broken to flow the light-cured resin E into the connecting chamber S to spread over the multiple toothed projections 25, the multiple toothed faces 14, the slit 24 and the cutout 23, and the abutment 26 is rotated to the desired angle. Thereafter, a light emitting diode (LED) light emits blue lights to solidify the light-cured resin E, and the crown 70 is mounted on the abutment 26 after a wound heals.

After stopping rotating the abutment 26 to the desired angle, the screw bolt 30 is screwed into the receiving trench 15 of the implant 10.

Thereby, the implant and abutment tooth assembly is implanted into the inclined front gums of the bone ridge 50 to enhance the probability of success and the quality of dental implant surgery greatly.

While various embodiments in accordance with the present invention have been shown and described, it is clear to those skilled in the art that further embodiments may be made without departing from the scope of the present invention.

What is claimed is:

1. An implant and abutment tooth assembly comprising:
   an implant including a threaded section, and a rotatable adjustment seat formed on a top of the threaded section, wherein the rotatable adjustment seat has an upper connection portion, the upper connection portion has a groove defined on a top of the upper connection portion, two spherical portions radially opposing to each other and rotatably connected beside the groove, and a receiving trench formed on a center of the groove;
   a rotatable connector including a spherical rotation face formed on the rotatable connector, two end faces formed beside the spherical rotation face radially opposing to each other, wherein the spherical rotation face is rotatably accommodated in the groove of the implant, the two end faces contact with the two spherical portions respectively, the rotatable connector has an abutment extending from a side of the rotatable connector along a central axis of the rotatable connector, an internal screwing section formed in a center of the abutment and passing to the rotatable connector, and a stepped notch formed on a top of the internal screwing section with respect to the abutment;
   a screw bolt including an external screwing section, a rotary head arranged on a top of the external screwing section, and a force segment formed on a bottom of the screw bolt, wherein the external screwing section is screwed with the internal screwing section of the rotatable connector, and the rotary head is movably received in the stepped notch of the rotatable connector; and
   a photocurable resin capsule including 0.1 g to 0.8 g of light-cured resin fixed in the photocurable resin capsule and being accommodated in the receiving trench of the implant.

2. An implant and abutment tooth assembly as claimed in claim 1, wherein the groove of the implant includes multiple toothed faces formed on a center of the groove, and the spherical rotation face of the rotatable connector has multiple toothed projections arranged on a bottom of the spherical rotation face to correspond to the multiple toothed faces, wherein a slit is defined among the multiple toothed projections, and a respective end face of the rotatable connector has a cutout defined on a center of the respective end face to correspond to the slit.

3. An implant and abutment tooth assembly as claimed in claim 1, wherein the abutment is formed in a square pyramid shape and has a recess formed around a predetermined area thereof of the abutment.

* * * * *